(12) United States Patent
Porte et al.

(10) Patent No.: US 10,940,935 B2
(45) Date of Patent: Mar. 9, 2021

(54) ACOUSTIC TREATMENT PANEL COMPRISING CELLS WHICH EACH CONTAIN A PLURALITY OF CONDUITS

(71) Applicant: Airbus Operations (S.A.S.), Toulouse (FR)

(72) Inventors: Alain Porte, Colomiers (FR); Jacques Lalane, Saint Orens de Gameville (FR); Maud Lavieille, Tournefeuille (FR)

(73) Assignee: Airbus Operations (S.A.S.), Toulouse (FR)

( * ) Notice: Subject to any disclaimer, the term of this patent is extended or adjusted under 35 U.S.C. 154(b) by 433 days.

(21) Appl. No.: 15/961,316

(22) Filed: Apr. 24, 2018

(65) Prior Publication Data

US 2018/0304987 A1   Oct. 25, 2018

(30) Foreign Application Priority Data

Apr. 25, 2017   (FR) ...................... 1753556

(51) Int. Cl.
| | |
|---|---|
| *B64C 1/40* | (2006.01) |
| *G10K 11/168* | (2006.01) |
| *G10K 11/172* | (2006.01) |
| *B64D 33/02* | (2006.01) |

(Continued)

(52) U.S. Cl.
CPC ............... *B64C 1/40* (2013.01); *B64D 33/02* (2013.01); *F02C 7/045* (2013.01); *G10K 11/168* (2013.01); *G10K 11/172* (2013.01); *B32B 3/266* (2013.01); *B32B 2307/102* (2013.01); *B32B 2605/18* (2013.01); *B64D 2033/0206* (2013.01); *F05D 2260/963* (2013.01); *Y02T 50/60* (2013.01)

(58) Field of Classification Search
CPC .. B64C 1/40; B64D 33/02; B64D 2033/0206; F02C 7/045; G10K 11/168; G10K 11/172; B32B 3/266; B32B 2307/102; B32B 2605/18
See application file for complete search history.

(56) References Cited

U.S. PATENT DOCUMENTS

| | | |
|---|---|---|
| 3,887,031 A | 6/1975 | Wirt |
| 3,913,702 A | 10/1975 | Wirt et al. |

(Continued)

FOREIGN PATENT DOCUMENTS

| | | |
|---|---|---|
| EP | 1111584 A1 | 6/2001 |
| EP | 1355294 A1 | 10/2003 |

(Continued)

OTHER PUBLICATIONS

European Search Report for European Application No. 18166262.8 dated Sep. 19, 2018.

(Continued)

*Primary Examiner* — Forrest M Phillips
(74) *Attorney, Agent, or Firm* — Jenkins, Wilson, Taylor & Hunt, P.A.

(57) ABSTRACT

An acoustic treatment panel in which each cell includes a plurality of conduits which extend from the porous acoustically resistive structure to the reflective layer of the acoustic treatment panel, each conduit including at least one opening set away from the porous acoustically resistive structure and configured to cause the inside and the outside of the conduit to communicate.

10 Claims, 3 Drawing Sheets

(51) Int. Cl.
  *F02C 7/045* (2006.01)
  *B32B 3/26* (2006.01)

(56) References Cited

U.S. PATENT DOCUMENTS

| | | | |
|---|---|---|---|
| 2001/0005937 A1* | 7/2001 | Andre | B32B 27/12 |
| | | | 29/888.01 |
| 2016/0201317 A1 | 7/2016 | Liou et al. | |
| 2018/0304986 A1 | 10/2018 | Porte et al. | |

FOREIGN PATENT DOCUMENTS

| | | |
|---|---|---|
| EP | 3395675 B1 | 6/2019 |
| EP | 3395676 B1 | 6/2019 |
| FR | 2930670 A1 | 10/2009 |
| GB | 2005384 A | 4/1979 |
| WO | WO 9935007 A1 | 7/1999 |
| WO | WO 2016/164043 A1 | 10/2016 |

OTHER PUBLICATIONS

European Search Report for European Application No. 18166255.2 dated Sep. 24, 2018.
European Office Action for European Application No. 18166262.8 dated Oct. 5, 2018.
French Search Report for French Application 1753555 dated Dec. 14, 2017.
French Search Report for French Application 1753556 dated Dec. 25, 2017.
First Office Action Interview for U.S. Appl. No. 15/961,295 dated Oct. 13, 2020.
First Action Interview and Interview Summary for U.S. Appl. No. 15/961,295 dated Dec. 22, 2020.

\* cited by examiner

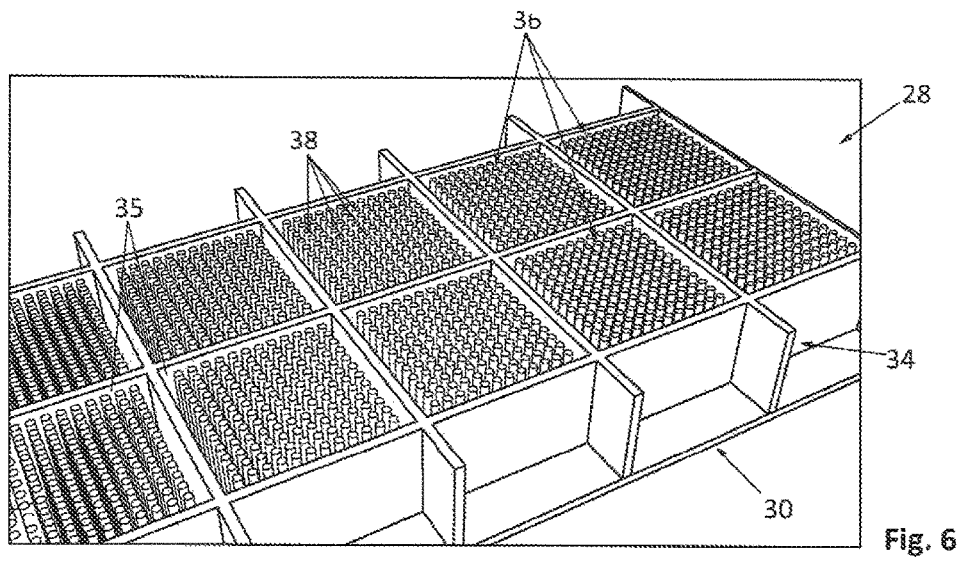
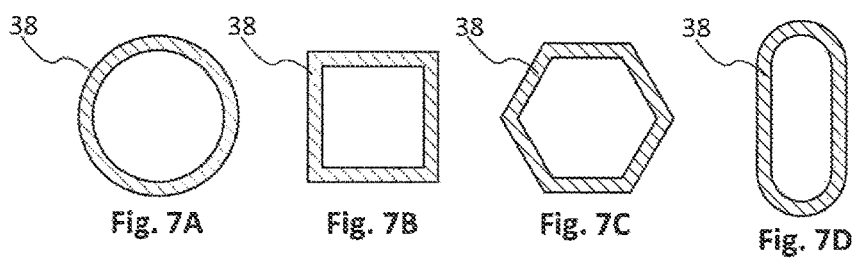
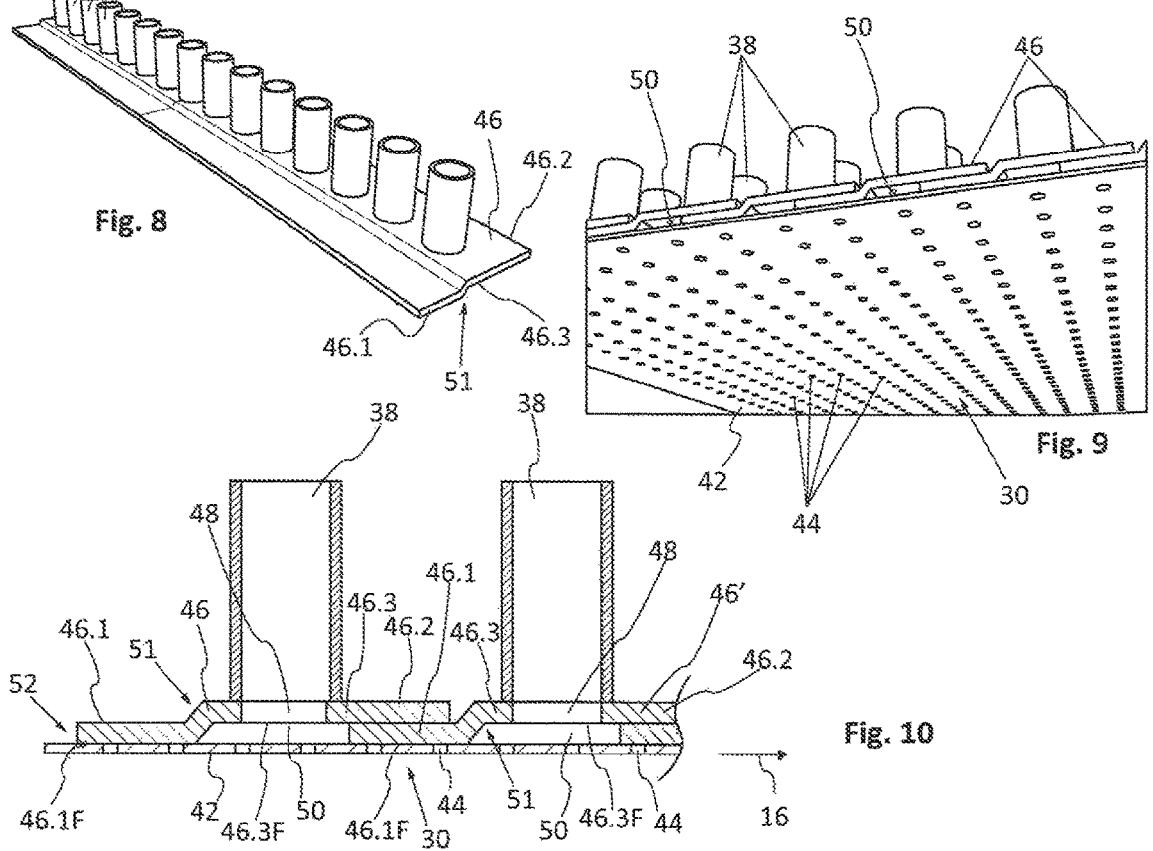
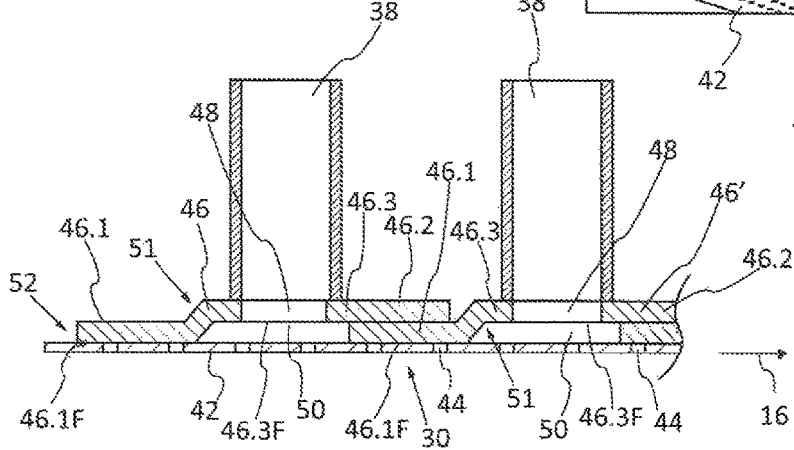

ACOUSTIC TREATMENT PANEL COMPRISING CELLS WHICH EACH CONTAIN A PLURALITY OF CONDUITS

CROSS-REFERENCE TO RELATED APPLICATION

This patent application claims priority to French patent application FR 17 53556, filed on Apr. 25, 2017, the entire disclosure of which is incorporated by reference herein.

TECHNICAL FIELD

The present disclosure relates to an acoustic treatment panel comprising cells which each contain a plurality of conduits.

BACKGROUND

An acoustic treatment panel comprises at least one cellular structure positioned between a reflective layer and a porous acoustically resistive layer in contact with an external environment through which soundwaves travel. Such a panel works on the Helmholtz resonator principle. Thus, the cellular structure comprises a plurality of cells, each of which forms an approximately fluid-tight cavity, and the porous acoustically resistive layer comprises a plurality of holes configured to cause the external environment to communicate with one of the cavities. This type of panel is used in an aircraft nacelle to lessen noise originating from an engine.

In order to attenuate low-frequency noises, document U.S. Pat. No. 3,887,031 describes an acoustic treatment panel which comprises, within each cell, a funnel-shaped conduit which has a first end of large cross section closed off by a portion of the porous acoustically resistive layer and a second end of reduced cross section closed off by a portion of the reflective layer. The conduit comprises an opening that causes the inside of the conduit to communicate with the zone delimited or defined by the cell and the conduit. The large cross section of the first end of the conduit is substantially equal to the cross section of the cell.

The disclosure herein seeks to improve the performance of acoustic treatment panels of the prior art.

SUMMARY

To this end, one subject of the disclosure herein is an acoustic treatment panel comprising a porous acoustically resistive structure in contact with an external environment in which during operation sound waves travel, a reflective layer and at least one cellular structure positioned between the porous acoustically resistive structure and the reflective layer and configured to compartmentalize a zone between the porous acoustically resistive structure and the reflective layer into a plurality of cells. According to the disclosure herein, each cell contains several conduits each of which has a first end closed off by a portion of the porous acoustically resistive structure, a second end closed off by a portion of the reflective layer, and at least one opening set away from the porous acoustically resistive structure and configured to cause the inside and the outside of the conduit to communicate.

The provision of a plurality of conduits in each cell makes it possible to improve the acoustic treatment by reinforcing in particular the attenuation of soundwaves at low frequencies and makes it possible to reinforce the compression resistance of the acoustic treatment panel at the centre of each cell.

According to other features relating to the conduits:
 a ratio between a cross section of the cell and a cross section of a conduit is greater than or equal to 10, preferably greater than 20;
 each conduit has a cross section less than or equal to 0.04 $cm^2$;
 each conduit has a cross section that is constantly between the first and second ends;
 the conduits are rigid;
 the cells are delimited or defined by partitions oriented in a first direction and in a second direction perpendicular to the first direction and, in each cell, the conduits are positioned along lines parallel to the first direction and along rows parallel to the second direction;
 each conduit has a circular cross section with a diameter of between 0.5 and 2 mm.

According to other features relating to the openings:
 each conduit comprises a single opening which takes the form of a slot which comprises a longest dimension oriented parallel to an axis of the conduit;
 the openings of all the conduits of the one same cell are identical and extend from the reflective layer over a length of the order of one third of the total length of the conduits.

Another subject of the disclosure herein is an aircraft comprising an acoustic treatment panel according to one of the preceding features.

BRIEF DESCRIPTION OF THE DRAWINGS

Further features and advantages will become apparent from the description of the disclosure herein which is about to follow, which description is given by way of purely illustrative example and with reference to the following, example drawings, in which:

FIG. 6 is a perspective view of part of an acoustic treatment panel illustrating another embodiment, the reflective layer not being depicted;

FIGS. 7A through 7D are cross sections through a conduit illustrating various embodiments of the disclosure herein;

FIG. 8 is a perspective view of a strip provided with a row of conduits illustrating an embodiment of the disclosure herein;

FIG. 9 is a perspective view of part of an acoustic treatment panel comprising several strips as visible in FIG. 8;

FIG. 10 is a section through part of the acoustic treatment panel visible in FIG. 9;

DETAILED DESCRIPTION

Figure 1:
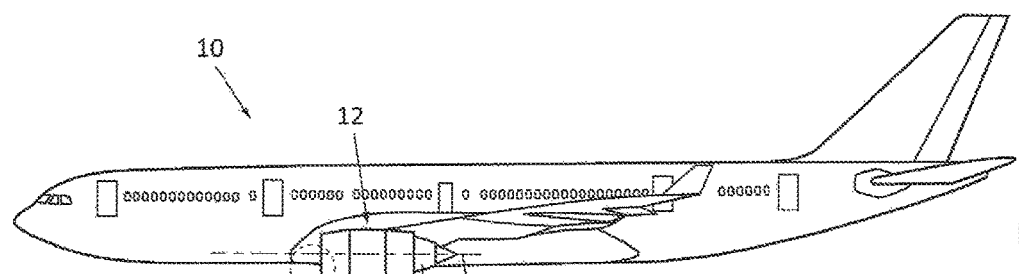
FIG. 1 is a side view of an aircraft.
Figure 2:
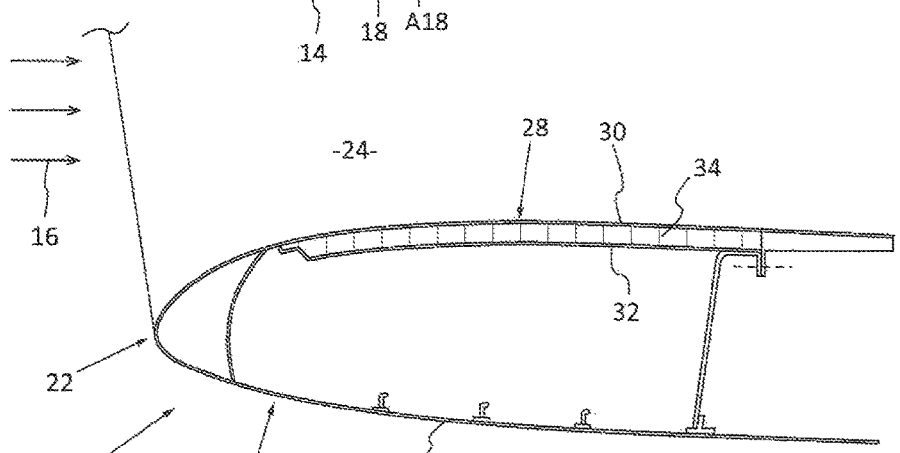
FIG. 2 is a longitudinal section through part of an air intake of a nacelle of the aircraft visible in FIG. 1.

As illustrated in FIGS. 1 and 2, an aircraft 10 comprises several propulsion assemblies 12 each of which comprises a nacelle 14 configured to duct a flow of air 16 towards an engine 18. To do that, the nacelle comprises an air intake 20 which, in the direction in which the stream of air 16 flows, has a lip 22 extended inside by an internal duct 24 to duct the air flow 16 towards the engine 18 and towards the outside via an exterior surface 26.

In order to limit noise nuisance, the interior duct 24 is formed, at least in part, of at least one acoustic treatment panel 28. In general, the air intake 20 comprises several acoustic treatment panels 20 juxtaposed to form the interior duct 24.

In the remainder of the description, a longitudinal direction is a direction parallel to the direction of the air flow 16 or the drive axis referenced A18. A radial direction is a direction perpendicular to the drive axis A18. A transverse direction is a direction perpendicular to the longitudinal and radial directions. A longitudinal plane is a plane passing through the drive axis A18 and a transverse plane is a plane perpendicular to the drive axis A18.

Although described in an application to an air intake, the acoustic treatment panel of the disclosure herein is not in any way restricted to this area of the aircraft. It may be positioned in other parts of the aircraft 10 or used for other applications.

The acoustic treatment panel 28 comprises a porous acoustically resistive structure 30 in contact with an external environment in which the flow of air 16 and soundwaves travel during operation, a reflective layer 32 and at least one cellular structure 34 positioned between the porous acoustically resistive structure 30 and the reflective layer 32.

The reflective layer 32 comprises at least one nonporous sheet made of metal or of a composite material.

The cellular structure 34 is configured to compartmentalize the zone between the porous acoustically resistive structure 30 and the reflective layer 32 into a plurality of cells 36. Each cell 36 is more or less fluid-tight and delimited or defined by at least one lateral wall 35 which forms a tube closed off at a first end by a portion of the porous acoustically resistive structure 30 and at a second end by a portion of the reflective layer 32.

Figure 4:
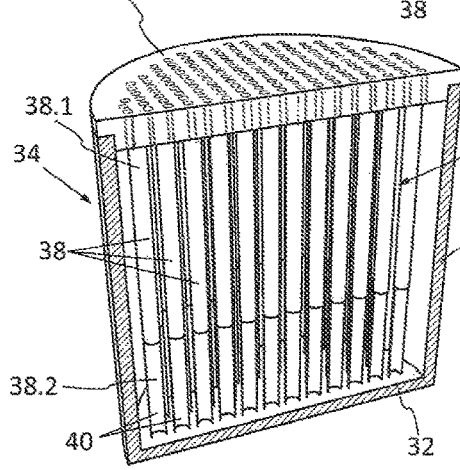
FIG. 4 is a cross section of a cell of an acoustic treatment panel illustrating a second embodiment of the disclosure herein from a first viewpoint.
Figure 5:
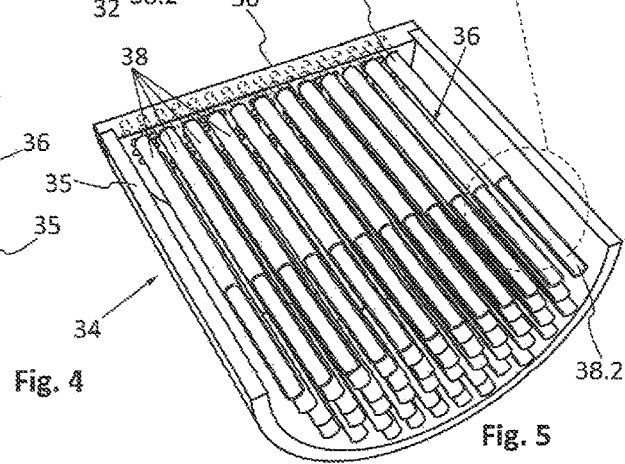
FIG. 5 is a cross section of the cell visible in FIG. 4 from a second viewpoint, the reflective layer not being depicted.

Depending on the embodiment, the cells 36 have cross sections (in a plane of section parallel to the reflective layer 32) which are circular as illustrated in FIGS. 4 and 5, square or rectangular as illustrated in FIG. 6, hexagonal or some other shape.

As a rough indicator as to size, each cell 36 has a cross sectional area of the order of 1 cm$^2$ or more.

The cellular structure 34 may be made of metal or of composite material.

According to one feature of the disclosure herein, each cell 36 contains several conduits 38 each of which has a first end 38.1 closed off by a portion of the porous acoustically resistive structure 30, a second end 38.2 closed off by a portion of the reflective layer 32, and at least one opening 40 set away from the porous acoustically resistive structure 30 and configured to cause the inside and the outside of the conduit 38 to communicate with one another.

The ratio between the cross section of the cell 36 and the cross section of a conduit 38 is greater than or equal to 10, and preferably greater than 20.

Each conduit 38 has a cross sectional area less than or equal to 0.04 cm$^2$. Each conduit 38 has a cross section that is constant between the first and second ends 38.1 and 38.2.

According to one embodiment, the conduits 38 are rigid. They are made of metal or of composite material.

According to one embodiment, each conduit 38 comprises a single opening 40 which takes the form of a slot the longest dimension of which is oriented parallel to the axis of the conduit 38. Each opening 40 extends over a portion of the circumference of the conduit 38, which portion is less than or equal to half the circumference.

Figure 3:
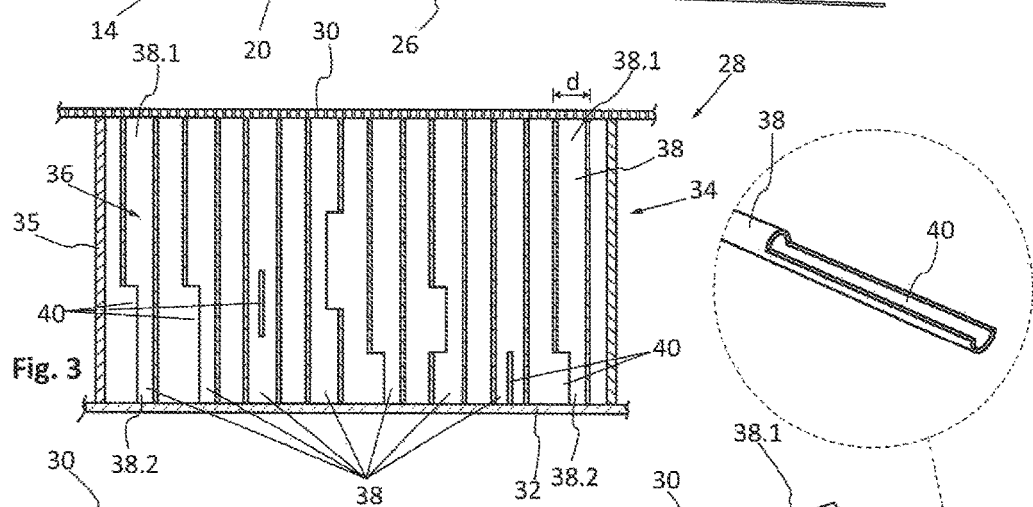
FIG. 3 is a section through a cell of an acoustic treatment panel illustrating a first embodiment of the disclosure herein.

According to an embodiment visible in FIGS. 4 and 5, the openings 40 of all the conduits 38 of the one same cell 36 are identical and extend from the reflective layer 32 over a length of the order of one third of the total length of the conduits 38. Of course, the disclosure herein is not restricted to this embodiment. As illustrated in FIG. 3, for the one same cell, the openings 40 may be different and/or positioned differently from one conduit 38 to the other. The conduits 38 and the openings 40 may all be identical within a cell and different from one cell to the other.

According to a configuration visible in FIG. 6, the cells 36 each have a square or rectangular cross section and are delimited or defined by partitions 35 oriented in a first direction and in a second direction perpendicular to the first direction. According to one embodiment, the first direction is parallel to the longitudinal direction.

Within each cell, the conduits 38 are positioned, in lines parallel to the first direction and in rows parallel to the second direction.

According to an embodiment illustrated in FIG. 7A, each conduit 38 has a circular cross section with a diameter of between 0.5 and 2 mm.

According to other embodiments illustrated in FIGS. 7B, 7C and 7D, each conduit 38 respectively has a square or rectangular, hexagonal or elliptical cross section.

Providing several conduits of small cross section within each cell makes it possible to treat sound waves at low frequencies and limits the risk of the acoustic panel becoming crushed in the middle of each cell.

According to another feature, the porous acoustically resistive structure 30 comprises at least one external layer 42 which is in contact with the airstream 16 and which has through holes 44, internal strips 46 comprising openings 48 each of which communicates with the inside of a cell 36 via a conduit 38 and connecting canals 50, interposed between the external layer 42 and the internal strips 46, which communicate, on the one hand, with at least one of the through holes 44 of the external layer 42 and, on the other hand, with at least one of the openings 48 of one of the internal strips 46. The connecting canals 50 make it possible to ensure that the small-section openings 48 communicate with at least one through hole 44 of the external layer 42.

Depending on the circumstances, the external layer 42 is made of metal or of composite material or comprises a superposition of several layers of metal and/or of composite material.

Figure 12:
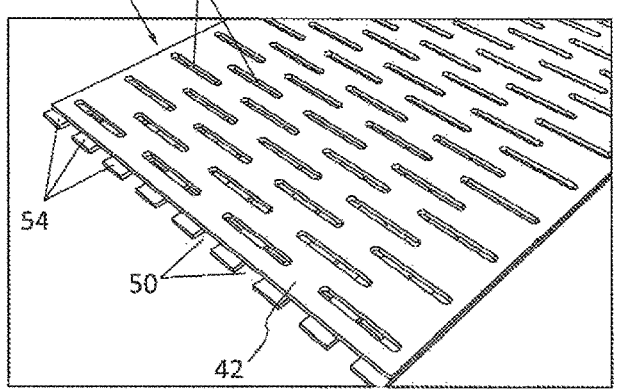
FIG. 12 is a perspective view of the acoustic treatment panel visible in FIG. 11, from the outside of the panel.
Figure 15:
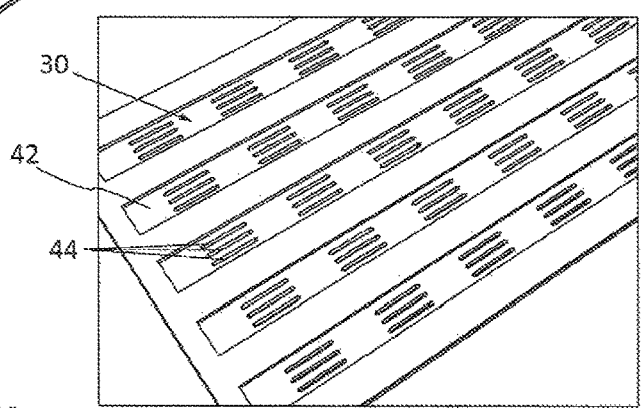
FIG. 15 is a face-on view of an acoustic treatment panel illustrating another embodiment of the disclosure herein.

Depending on the embodiment, the through holes 44 are circular, as illustrated in FIG. 9, and oblong, as illustrated in FIGS. 12 and 15.

Figure 14:
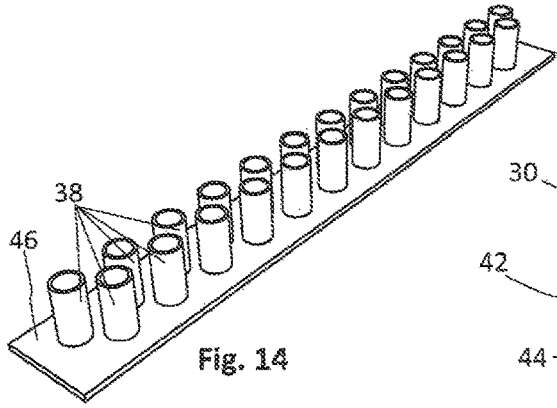
FIG. 14 is a perspective view of a strip provided with several rows of conduits illustrating another embodiment of the disclosure herein.

According to one embodiment visible in FIG. 8, each internal strip 46 comprises a row of conduits 38. According to another embodiment visible in FIG. 14, each internal strip 46 comprises several rows of conduits 38, arranged in a staggered configuration.

For each internal strip 46, the conduits 38 are attached to the internal strip 46 before it is assembled with other internal strips 46 or other elements of the acoustic treatment panel.

The internal strips 46 and the conduits 38 may be made of metal or of composite material and are joined together by welding or bonding. As an alternative, each internal strip 46 and its conduits 38 are produced by additive manufacturing.

Each strip 46 comprises two parallel lateral edges 46.1 and 46.2, and a middle zone 46.3 interposed between the lateral edges 46.1 and 46.2 which has the openings 48 communicating with the conduits 38.

According to a first embodiment visible in FIG. 8, one of the lateral edges 46.2 has a swage 51. The internal strips 46 are assembled in a fluid-tight manner with one another by superposing the lateral edges 46.1 and 46.2 of two adjacent interior strips 46, 46' to form an internal layer 52, as illustrated in FIG. 10. Away from the openings 48, the internal layer 52 obtained is fluid-tight, and this contributes towards making the cells 36 fluid-tight.

According to this embodiment, when the internal strips 46 are assembled, the lateral edges 46.1 of the various internal strips 46 form contact surfaces 46.1F and the middle zones 46.3 of the internal strips 46 are offset in relation to these contact surfaces 46.1F and each form a channel 46.3F.

Thus, as illustrated in FIG. 10, when the internal layer 52 is assembled with the external layer 42, the middle zones 46.3 of the internal strips 46 are spaced away from the internal layer 42, and each channel 46.3F closed by the external layer 42 forms a connecting canal 50.

In order to increase the cross section of the connecting canals 50, foils are interposed between the internal layer 52 and the external layer 42. Each foil takes the form of a strip of material. These foils lie parallel to one another and are spaced apart. Depending on the configuration, the foils are oriented parallel to the lateral edges 46.1 and superposed therewith or are oriented at right angles to the lateral edges 46.1.

Figure 11:
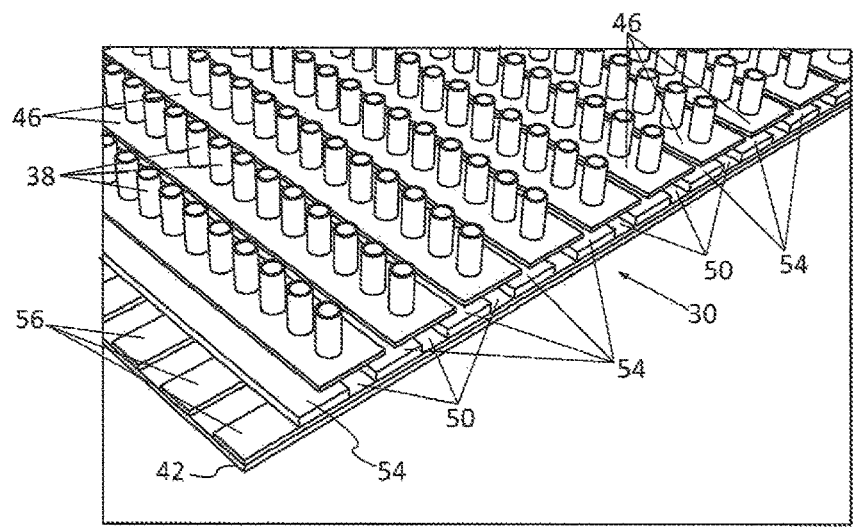
FIG. 11 is a perspective view of part of an acoustic treatment panel illustrating another embodiment from the inside of the panel.
Figure 13:
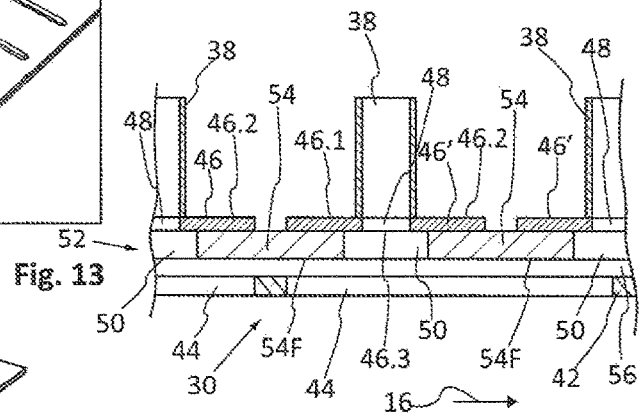
FIG. 13 is a section through the acoustic treatment panel visible in FIG. 11.

According to a second exemplary embodiment visible in FIGS. 11 through 13, the internal strips 46 are planar and joined together by intermediate strips 54 to form an internal layer 52. The lateral edge 46.1 of a first internal strip 46 is superposed on and connected, in a fluid-tight manner by any appropriate means, to one of the edges of an intermediate strip 54, and the lateral edge 46.2 of a second internal strip 46' is superposed on and connected, in a fluid-tight manner by any appropriate means, to the other edge of the intermediate strip 54.

Away from the openings 48, the interior layer 52 achieved is fluid-tight, thereby contributing to making the cells 36 fluid-tight.

Each intermediate strip 54 offers a contact surface 54F. Because the intermediate strips 54 are spaced apart, the middle zone 46.3 of each internal strip 46 delimits, between two intermediate strips 54, a channel 46.3F.

Thus, as illustrated in FIG. 11, when the internal layer 52 is assembled with the external layer 42, the middle zones 46.3 of the internal strips 46 are spaced away from the internal layer 42 and each channel 46.3F closed by the external layer 42 forms a connecting canal 50.

In order to increase the cross section of the connecting canals 50, foils 56 are interposed between the internal strips 46 and the external layer 42. Each foil 56 takes the form of a strip of material. The foils 56 lie parallel to one another and are spaced apart. Depending on the configuration, the foils 56 are oriented parallel to the lateral edges 46.1 and superposed therewith or are oriented at right angles to the lateral edges 46.1, as illustrated in FIGS. 11 through 13.

Figure 16:
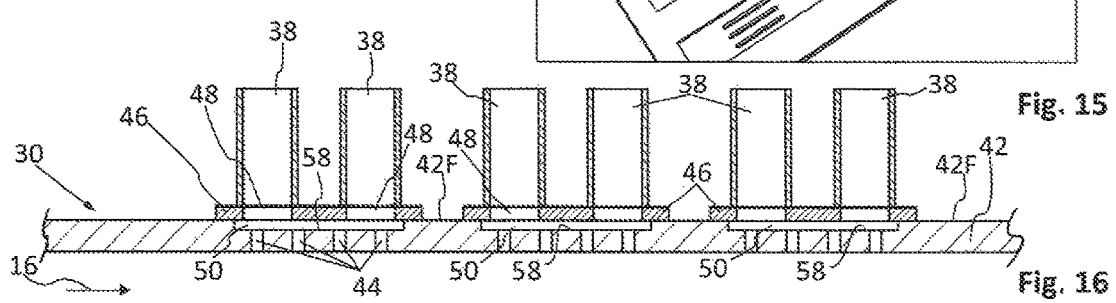
FIG. 16 is a section through the panel for the acoustic treatment visible in FIG. 15.

According to a third embodiment visible in FIGS. 15 and 16, the external layer 42 comprises, on its face oriented towards the interior strips 46, mutually parallel and spaced-apart channels 58 into which the through holes 44 at least partially open. Between each of the channels 58, the external layer 42 comprises contact surfaces 42F which form an additional thickness by comparison with the bottoms of the channels 58. The internal strips 46 are assembled with the internal layer 42 in such a way as to close each channel 58 to obtain connecting canals 50. For this purpose, for each channel 58, the first lateral edge 46.1 of an internal strip 46 is connected in a fluid-tight manner to a first contact surface 42F positioned on a first side of the channel 58, and the second lateral edge 46.2 of the internal strip 46 is connected in a fluid-tight manner to a second contact surface 42F' positioned on a second side of the channel 58.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic treatment panel comprising:
   a porous acoustically resistive structure in contact with an external environment in which during operation sound waves travel;
   a reflective layer and at least one cellular structure positioned between the porous acoustically resistive structure and the reflective layer and configured to compartmentalize a zone between the porous acoustically resistive structure and the reflective layer into a plurality of cells; and
   each of the plurality of cells containing several conduits, each of which has a first end closed off by a portion of the porous acoustically resistive structure, a second end closed off by a portion of the reflective layer, and at least one opening set away from the porous acoustically resistive structure and configured to cause an inside and an outside of the conduit to communicate.

2. The acoustic treatment panel according to claim 1, wherein a ratio between a cross section of the cell and a cross section of a conduit is greater than or equal to 10, or greater than 20.

3. The acoustic treatment panel according to claim 2, wherein each conduit has a cross section less than or equal to 0.04 $cm^2$.

4. The acoustic treatment panel according to claim 1, wherein each conduit has a cross section that is constant between the first and second ends.

5. The acoustic treatment panel according to claim 1, wherein the conduits are rigid.

6. The acoustic treatment panel according to claim 1, wherein each conduit comprises a single opening which takes a form of a slot which comprises a longest dimension oriented parallel to an axis of the conduit.

7. The acoustic treatment panel according to claim 6, wherein openings of all the conduits of one same cell are identical and extend from the reflective layer over a length of an order of one third of a total length of the conduits.

8. The acoustic treatment panel according to claim 1, wherein the cells are defined by partitions oriented in a first direction and in a second direction perpendicular to the first direction and wherein, in each cell, the conduits are positioned along lines parallel to the first direction and along rows parallel to the second direction.

9. The acoustic treatment panel according to claim 1, wherein each conduit has a circular cross section with a diameter of between 0.5 and 2 mm.

10. An aircraft comprising an acoustic treatment panel, comprising:

a porous acoustically resistive structure in contact with an external environment in which during operation sound waves travel;

a reflective layer and at least one cellular structure positioned between the porous acoustically resistive structure and the reflective layer and configured to compartmentalize a zone between the porous acoustically resistive structure and the reflective layer into a plurality of cells; and each of the plurality of cells containing several conduits, each of which has a first end closed off by a portion of the porous acoustically resistive structure, a second end closed off by a portion of the reflective layer, and at least one opening set away from the porous acoustically resistive structure and configured to cause an inside and an outside of the conduit to communicate.

* * * * *